UNITED STATES PATENT OFFICE.

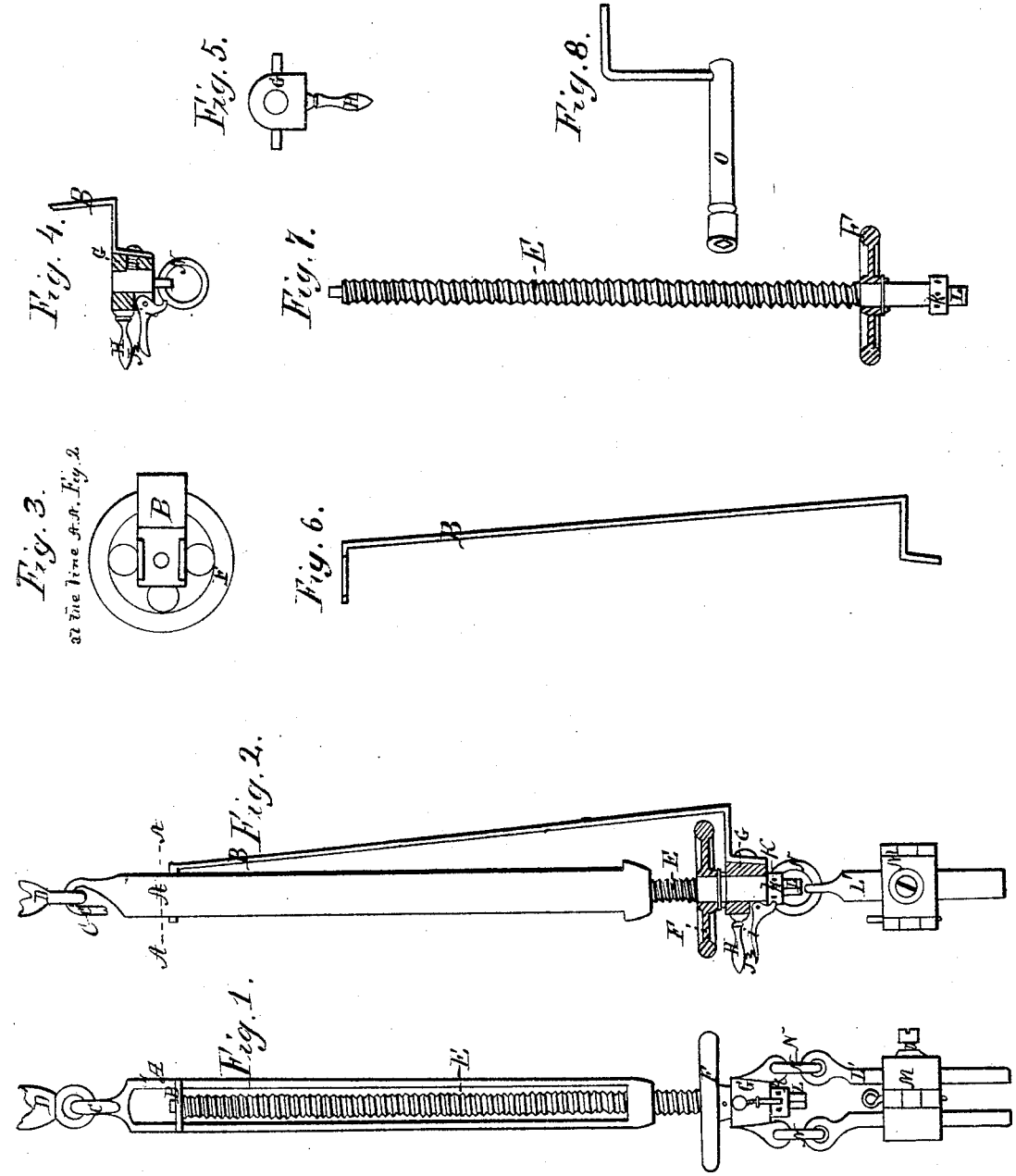

R. S. TORREY, OF BANGOR, MAINE.

IMPROVEMENT IN DRILL-ROD ATTACHMENTS.

Specification forming part of Letters Patent No. 50,857, dated November 7, 1865.

*To all whom it may concern:*

Be it known that I, R. S. TORREY, of the city of Bangor, county of Penobscot, and State of Maine, have invented a new and useful Improvement in Temper Bar and Screw for Drilling Purposes; and I do hereby declare that the following is a clear and exact description of the same, reference being had to the accompanying drawings, making part of this specification.

Figure 1 is a side view of temper-bar, hand-wheel, thumb-latch, wing-swivel, and clamps. Fig. 2 is a side view of temper-bar, brace-bars, section of hand-wheel, thumb, wing-swivel, and clamps. Fig. 3 is a plan of brace-bars at the line A A, Fig. 2. Fig. 4 is a sectional view of the wing-swivel, showing thumb-latch. Fig. 5 is a plan of wing-swivel. Fig. 6 is a side elevation of brace-bar. Fig. 7 is a view of temper-screw, with hand-wheel, showing ratchet-head. Fig. 8 is a view of socket-wrench.

This invention consists in so forming or constructing a temper bar or screw for drilling purposes, and in so providing said temper-bar with hand-wheel, wing-swivel, and thumb-latch as to facilitate the tempering and jar of drill, so as to render the machine more certain and effective in the action.

To enable others skilled in the art to make and use my invention, I will proceed to describe its construction and operation.

To the eye D, Figs. 1 and 2, is suspended temper-bar A, temper-screw E, and clamp L'. The upper end of temper-screw E passes through a brace-bar, B, which keeps it firm and steady. Brace-bar B, Fig. 2, is guided by the inside of temper-bar A, Figs. 1 and 2, which it is made to fit without lateral play, and which serve as slides or guides. This brace-bar B is bent at a suitable angle, and is made secure to wing-swivel G, Figs. 1 and 2, which has a thumb-latch, i, Figs. 2 and 4, with a suitable spring, J, Figs. 1 and 4, to keep it in its proper place, made also in such a manner as to operate in and hold temper-screw E, Figs. 1, 2, and 7, by the aid of ratchet-head K, Figs. 1, 2, and 7, at the lower end of said temper-screw E. Therefore, when thumb-latch i is in ratchet-head K, it secures the screw E from turning either way until thumb-latch i is released, so that the brace-bar B does away with the ordinary jam-nut. A hand-wheel, F, Figs. 1, 2, and 7, is also attached to temper-screw E, just above wing-swivel G, by a pin passing through the hub of the same, making the screw E and hand-wheel F, as it were, one piece. The temper-screw E is fed down by the hand-wheel F, and is run back by a socket-wrench, O, Fig. 8, placed on square L, below ratchet-head K, at the end of temper-screw E. Clamping the rope is done by the ordinary clamps, L I.

Operation: In order to illustrate the manner in which the several before-described parts operate, we will suppose the machine to be in regular operation. When temper-screw E, Fig. 1, is extended it is required to run it back, which is done by placing socket-wrench O, Fig. 8, on square below wing-swivel G. Now, to feed down the drill, you release the thumb-latch i, Fig. 2, and turn the hand-wheel F as much as required. This being done, the thumb-latch i, Figs. 2 and 4, holds temper-screw E firm and secure. The brace-bar B, Figs. 2 and 6, being secured to wing-swivel G, Figs. 2, 4, 5, and 6, at one end, and attached to temper-screw E at the other end, holds temper-screw E from working down while in operation, doing away with jam-nut now used.

What I claim as new, and desire to secure by Letters Patent, is—

1. The brace-bar B, Fig. 6, or its equivalent, which connects the temper-screw E with wing-swivel G, Fig. 2, doing away with jam-nut, substantially as set forth, for the purpose described.

2. The hand-wheel F, Fig. 7, in combination with screw E and ratchet-head K, Fig. 7, as herein described.

3. The wing-swivel G, Figs. 4 and 5, and thumb-latch i, Fig. 4, which makes the whole thing secure while the machine is in operation, the whole operating in the manner and for the purpose set forth.

R. S. TORREY.

Witnesses:
R. D. O. SMITH,
EDM. F. BROWN.